(12) United States Patent
Sugo et al.

(10) Patent No.: US 6,723,432 B2
(45) Date of Patent: Apr. 20, 2004

(54) ELECTRODE-FORMING COMPOSITIONS AND ELECTRODE MEMBERS

(75) Inventors: Michihiro Sugo, Gunma-ken (JP); Hideto Kato, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 3 days.

(21) Appl. No.: 10/105,263

(22) Filed: Mar. 26, 2002

(65) Prior Publication Data
US 2003/0040578 A1 Feb. 27, 2003

(30) Foreign Application Priority Data
Mar. 27, 2001 (JP) ........................................ 2001-089667

(51) Int. Cl.⁷ .............................................. B32B 15/08
(52) U.S. Cl. ........................ 428/418; 428/413; 428/450; 428/458; 523/457; 524/778; 528/28; 528/38
(58) Field of Search ................................ 428/418, 413, 428/450, 458; 523/457; 524/779; 528/28, 38; 427/387, 386

(56) References Cited

U.S. PATENT DOCUMENTS

| | | | |
|---|---|---|---|
| 5,476,908 A | * 12/1995 | Kishi et al. ................ | 525/393 |
| 5,492,586 A | * 2/1996 | Gorczyca .................... | 156/245 |
| 5,922,466 A | * 7/1999 | Angelopoulos et al. ..... | 428/418 |
| 6,538,093 B2 | * 3/2003 | Sugo et al. .................. | 528/28 |
| 2002/0005247 A1 | * 1/2002 | Graham et al. ............. | 156/291 |

FOREIGN PATENT DOCUMENTS

| | | |
|---|---|---|
| JP | 9-270370 | 10/1997 |
| JP | 2000-154250 | * 6/2000 |

OTHER PUBLICATIONS

Machine translation, JP 2000–154250, Ishikawa et al., Jun. 6, 2000.*

* cited by examiner

*Primary Examiner*—Robert Dawson
*Assistant Examiner*—Christopher Keehan
(74) *Attorney, Agent, or Firm*—Birch, Stewart, Kolasch & Birch, LLP

(57) ABSTRACT

An electrode-forming composition comprising a binder component containing a solvent-soluble polyimide silicone and an epoxy compound, and an electrically conductive material can be cured and bonded to a current collector at a relatively low temperature and has excellent adhesion and chemical resistance, facilitating the manufacture of lithium ion batteries and electrical double-layer capacitors of various shapes.

10 Claims, No Drawings

ELECTRODE-FORMING COMPOSITIONS AND ELECTRODE MEMBERS

This invention relates to electrode-forming compositions having improved heat resistant adhesion and electrode members, and more particularly, to electrode-forming compositions and electrode members suitable for use in lithium ion batteries and electrical double-layer capacitors.

BACKGROUND OF THE INVENTION

Electrode-forming compositions or adhesive compositions and electrode members are generally constructed of an electrically conductive component such as carbonaceous materials (e.g., activated carbon or carbon black) and fine particles of conductive metal oxides and a binder component capable of bonding to or forming a surface layer on a current collector of aluminum or the like. They are utilized as electrically conductive electrodes in rechargeable lithium ion batteries and electrical double-layer capacitors.

The binder components known in the art include resinous binders such as cellulose, and inorganic binders such as water glass. The resinous binders are less resistant to heat and organic electrolyte solutions whereas the inorganic binders are less adhesive to current collectors. JP-A 9-270370 proposes the use of polyimide resins and polyamide imide resins as the binder component capable of overcoming these drawbacks. However, the polyimide resins and polyamide imide resins are generally diluted with high-boiling solvents such as N-methyl-2-pyrrolidone, which requires high-temperature treatment in order to evaporate off the solvent and form a resin coating. Even when polyamic acid which is a polyimide precursor is used, high-temperature treatment is still needed in order to form a polyimide resin by way of dehydration and ring closure. Another drawback of the polyimide resins and polyamide imide resins is that they are less adhesive to metals and less flexible.

SUMMARY OF THE INVENTION

An object of the present invention is to provide an electrode-forming composition of the heat curing type which can form an electrically conductive electrode at relatively low temperatures and which has improved chemical resistance, heat resistant adhesion to current collectors, and flexibility. Another object of the present invention is to provide an electrode member obtained using the electrode-forming composition.

Making a study on an electrically conductive composition comprising an electrically conductive material and a binder component, we have discovered that use of a solvent-soluble polyimide silicone and an epoxy compound as the binder component leads to an electrode-forming composition of the heat curing type from which an electrically conductive electrode can be formed at relatively low temperatures and which has improved chemical resistance, heat resistant adhesion to current collectors, and flexibility.

Accordingly, the present invention provides an electrode-forming composition comprising a binder component containing a solvent-soluble polyimide silicone and an epoxy compound, and an electrically conductive material; and an electrode member obtained by applying the composition to a current collector and heat curing.

DESCRIPTION OF THE PREFERRED EMBODIMENTS

The binder component used in the electrode-forming composition and the electrode member according to the invention includes a solvent-soluble polyimide silicone and an epoxy compound.

The polyimide silicone used herein preferably has a structure represented by the following general formula (1).

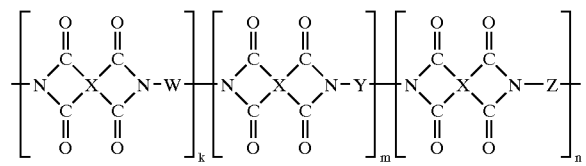

In formula (1), X is at least one tetravalent organic group of the following formula (2), (3) or (4).

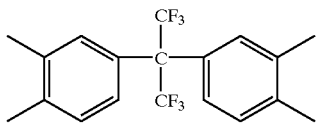

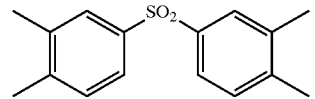

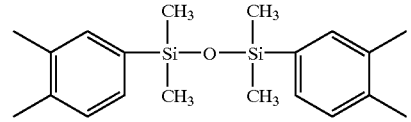

W is a divalent organic group of the following general formula (5):

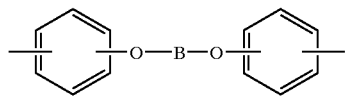

wherein B is a group of the following formula (6), (7) or (8).

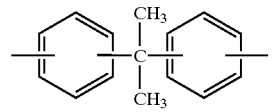

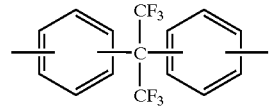

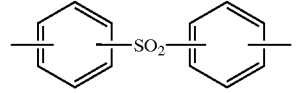

Y is a divalent organic group of the following general formula (9):

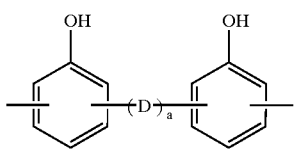

(9)

wherein D is $CH_2$, $(CH_3)_2C$ or $(CF_3)_2C$, and "a" is 0 or 1.

Z is a divalent siloxane residue of the following general formula (10):

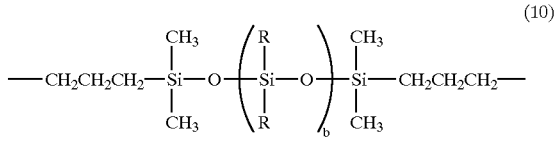

(10)

wherein R is independently a monovalent hydrocarbon group of 1 to 8 carbon atoms, and "b" is a positive number of 0 to 30.

In formula (1), k is a number corresponding to 3 to 40 mol %, m is a number corresponding to 40 to 90 mol %, and n is a number corresponding to 1 to 40 mol %.

In formula (10), R is independently selected from monovalent hydrocarbon groups of 1 to 8 carbon atoms, preferably 1 to 6 carbon atoms, for example, alkyl groups such as methyl, ethyl, propyl, pentyl and hexyl, cycloalkyl groups such as cyclohexyl, alkenyl groups such as vinyl, and aryl groups such as phenyl. Of these, methyl, phenyl and vinyl are preferred from the standpoint of availability of a corresponding reactant. The R groups may be the same or different. The letter "b" representative of the number of recurring siloxane units is preferably in the range of 1 to 30, and more preferably 5 to 20.

The units with subscript k account for 3 to 40 mol %, and preferably 10 to 30 mol % in formula (1). With k below the range, solvent solubility may be lost. Beyond the range, chemical resistance may become poor.

The units with subscript m account for 40 to 90 mol %, and preferably 60 to 85 mol % in formula (1). With m below the range, chemical resistance may sometimes be lost. Beyond the range, the compound may become solvent insoluble.

The units with subscript n account for 1 to 40 mol %, and preferably 5 to 20 mol % in formula (1). With n below the range, the resulting electrode member may not be expected flexible. Beyond the range, the compound may have a lower glass transition temperature and poor heat resistance.

It is acceptable to incorporate recurring polyimide units other than the aforementioned units in the polyimide silicone according to the invention.

In preparing the polyimide silicone according to the invention, any well-known method may be used. For example, a tetracarboxylic dianhydride, an aromatic diamine, a diamine having a phenolic hydroxyl group, and a diaminosiloxane are dissolved in a suitable solvent such as cyclohexanone, and reacted at a low temperature of about 20 to 50° C. to synthesize a polyamic acid which is a polyimide silicone precursor. The total amount of diamine components combined relative to the tetracarboxylic dianhydride component is determined as appropriate depending on the molecular weight of the polyimide silicone to be adjusted, and is usually in a molar ratio of from 0.95 to 1.05, preferably from 0.98 to 1.02. It is noted that a monofunctional reactant such as phthalic anhydride or aniline can be added for the purpose of adjusting the molecular weight of the polyimide silicone. When added, the amount of the monofunctional reactant is up to 2 mol % based on the amount of the polyimide silicone. Subsequently, the polyamic acid solution is heated at a temperature usually in the range of 80 to 200° C., preferably 140 to 180° C., to induce dehydration/ring closure reaction in the acid amide moiety of the polyamic acid. The polyimide silicone is then obtainable in solution form. Alternatively, an acetic anhydride/pyridine mixture is added to the polyamic acid solution, and the resulting solution is heated at about 50° C. for imidization.

Examples of the tetracarboxylic dianhydride include 3,3', 4,4'-diphenylsulfonetetracarboxylic dianhydride, 4,4'-hexafluoropropylidene bisphthalic dianhydride, and 1,3-bis (3,4-dicarboxyphenyl)-1,1,3,3-tetramethyldisiloxane.

Examples of the aromatic diamine include 2,2-bis[4-(4-aminophenoxy)phenyl]propane, 2,2-bis(4-aminophenoxyphenyl)hexafluoropropane, and bis[4-(4-aminophenoxy)phenyl]sulfone.

Examples of the phenolic hydroxyl-bearing diamine include 3,3'-dihydroxy-4,4'-diaminobiphenyl, 2,2-bis(3-amino-4-hydroxyphenyl)hexafluoropropane, and 2,2-bis(3-hydroxy-4-aminophenyl)propane.

The diaminosiloxane is preferably selected from those of the following general formula (11).

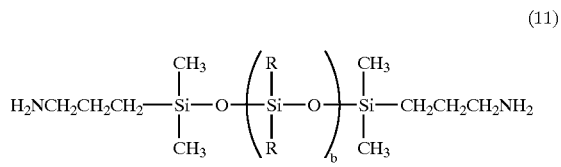

(11)

Herein, R is independently a monovalent hydrocarbon group of 1 to 8 carbon atoms, and "b" is an integer of 0 to 30. The definition of R and b in formula (11) is the same as in formula (10), with their preferred examples or range being also the same. Typical examples of the diaminosiloxane of formula (11) are given below.

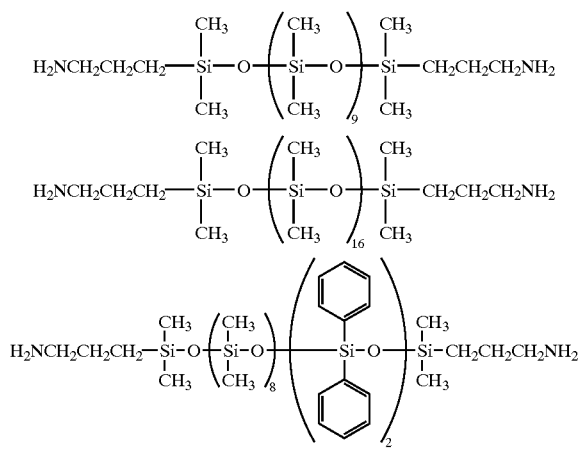

The polyimide silicone used herein preferably has a weight average molecular weight of about 5,000 to 500,000, and more preferably about 8,000 to 350,000.

The epoxy compound used herein is not critical as long as it is miscible with the polyimide silicone. Preferably the epoxy compound should have at least two epoxy groups per molecule. Exemplary of the epoxy compound having at least two epoxy groups per molecule are diglycidyl ether derivatives of bisphenol A, bisphenol F, resorcinol, etc. More preferred are epoxy compounds having at least three epoxy groups per molecule and an epoxy equivalent of up to 200 g/mol. Such epoxy compounds are, for example, N,N-diglycidyl-4-glycidyloxyaniline and 4,4'-methylene-bis(N, N-diglycidylaniline). Epoxy compounds with an epoxy equivalent in excess of 200 g/mol may provide the binder with a lower crosslinked density and hence, less chemical resistance.

In the binder component, the polyimide silicone and the epoxy compound are mixed in such a proportion that the ratio of the moles of epoxy groups in the epoxy compound to the moles of phenolic hydroxyl groups in the polyimide silicone is desirably from 1/1 to 3/1 and more desirably from 1.2/1 to 2/1. Outside the range, the binder component may have a lower crosslinked density and hence, less solvent resistance.

The other component in the electrode-forming composition of the invention is an electrically conductive material which may be selected from conductive materials well known in the art for use as the electrode constituent in secondary batteries, electrical double-layer capacitors and the like. Examples include activated carbon powder, carbon black, and fine particles of conductive metal oxides.

The binder component (including polyimide silicone and epoxy compound) and the conductive material are preferably mixed in such amounts that the composition may contain 5 to 70%, more preferably 10 to 60%, most preferably 20 to 50% by weight of the binder component and 30 to 95%, more preferably 40 to 90%, most preferably 50 to 80% by weight of the conductive material, the total amount of the binder component and the conductive material being 100% by weight. If the proportion of the binder component is less than 10 wt %, the composition may become less adherent to current collectors so that the resulting electrode has decreased strength. If the proportion of the binder component is more than 70 wt %, the resulting electrode may have an increased electrical resistivity above the practical level.

On use, the composition of the invention is preferably diluted with a solvent so that the binder component is dissolved therein. Preferred examples of the solvent used herein include ethers such as tetrahydrofuran and anisole; ketones such as cyclohexanone, 2-butanone, methyl isobutyl ketone, 2-heptanone, 2-octanone and acetophenone; esters such as ethyl acetate, butyl acetate, methyl benzoate and γ-butyrolactone; cellosolves such as butyl cellosolve acetate and propylene glycol monomethyl ether acetate; and amides such as N-methyl-2-pyrrolidone, N,N-dimethylformamide and N,N-dimethylacetamide. Of these, the ketones, esters and cellosolves are preferred, and most preference is given to cyclohexanone, 2-butanone, ethyl acetate, methyl isobutyl ketone and N-methyl-2-pyrrolidone. The solvents may be used alone or in admixture.

A catalyst may be added to the composition for promoting the reaction of phenolic groups in the polyimide silicone with epoxy groups in the epoxy compound. Any of well-known catalysts such as imidazoles, amines and acid anhydrides may be used in a conventional catalytic amount.

The electrode-forming composition is applied to a current collector and heat cured thereto, forming an electrode member. The current collector used herein may be any of well-known current collectors made of aluminum, copper, nickel, stainless steel, etc. for use in secondary batteries, electrical double-layer capacitors and the like. The thickness of the coating of the composition (i.e., electrode thickness) is selected as appropriate and is usually about 5 to 500 μm, and especially about 10 to 200 μm. The heat curing conditions include a temperature of about 150 to 230° C., especially about 170 to 200° C. and a time of about 5 to 60 minutes, especially about 10 to 30 minutes.

EXAMPLE

Synthesis Examples, Examples and Comparative Examples are given below for illustrating the present invention although the invention is not limited thereto. The compounds used in Synthesis Examples, Examples and Comparative Examples are abbreviated as follows. All parts are by weight.

DSDA: 3,3',4,4'-diphenylsulfonetetracarboxylic dianhydride
6FDA: 4,4'-hexafluoropropylidene bisphthalic anhydride
BAPS: bis[4-(4-aminophenoxy)phenyl]sulfone
BAPP: 2,2-bis[4-(4-aminophenoxy)phenyl]propane
HAB: 3,3'-dihydroxy-4,4'-diaminobiphenyl
HFP: 2,2-bis(3-amino-4-hydroxyphenyl)hexafluoropropane
HAP: 2,2-bis(3-hydroxy-4-aminophenyl)propane
DPE: 4,4'-diaminophenyl ether
GGA: N,N-diglycidyl-4-glycidyloxyaniline
MBGA: 4,4'-methylenebis(N,N-diglycidylaniline)

Synthesis Example 1

Synthesis of Polyimide Silicone

A flask equipped with a stirrer, thermometer and nitrogen inlet was charged with 107.4 g (0.30 mol) of DSDA and 400 g of cyclohexanone. Then a solution of 51.6 g (0.06 mol) of a diaminosiloxane of the formula (12) below wherein b=8.3, 32.7 g (0.15 mol) of HAB and 36.9 g (0.09 mol) of BAPP in 100 g of cyclohexanone was added dropwise to the flask at such a controlled rate that the temperature of the reaction system might not exceed 50° C. After the completion of dropwise addition, agitation was continued for 10 hours at room temperature.

(12)

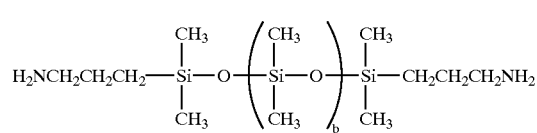

After a reflux condenser with a water trap was attached to the flask, 60 g of toluene was added to the solution, which was heated at 150° C. and held at the temperature for 6 hours, yielding a brown solution. The solution was poured into methanol. The solids were taken out and dried, obtaining a brown resin. It was analyzed by infrared absorption spectroscopy whereupon the absorption peak based on polyamic acid indicating the presence of unreacted functional groups did not develop, and instead, the absorption peaks attributable to imide group developed at 1780 cm$^{-1}$ and 1720 cm$^{-1}$. By gel permeation chromatography (GPC) using tetrahydrofuran as the solvent, the resin was measured to have a weight average molecular weight of 15,000 on a polystyrene standard. It had a phenol equivalent of 762 g/mol. This resin designated Polyimide Silicone Resin I was used in Example.

Synthesis Example 2

Synthesis of Polyimide Silicone

A flask equipped with a stirrer, thermometer and nitrogen inlet was charged with 107.4 g (0.30 mol) of DSDA and 400 g of cyclohexanone. Then a solution of 12.9 g (0.015 mol) of a diaminosiloxane of formula (12) wherein b=8.3, 58.1 g (0.225 mol) of HAP and 26.0 g (0.06 mol) of BAPS in 100 g of cyclohexanone was added dropwise to the flask at such a controlled rate that the temperature of the reaction system might not exceed 50° C. After the completion of dropwise addition, agitation was continued for 10 hours at room temperature.

After a reflux condenser with a water trap was attached to the flask, 60 g of toluene was added to the solution, which was heated at 150° C. and held at the temperature for 6 hours, yielding a brown solution. The solution was poured into methanol. The solids were taken out and dried, obtaining a brown resin. It was analyzed by infrared absorption spectroscopy whereupon the absorption peak based on polyamic acid indicating the presence of unreacted functional groups did not develop, and instead, the absorption peaks attributable to imide group developed at 1780 $cm^{-1}$ and 1720 $cm^{-1}$. By GPC using tetrahydrofuran as the solvent, the resin was measured to have a weight average molecular weight of 10,000 on a polystyrene standard. It had a phenol equivalent of 454 g/mol. This resin designated Polyimide Silicone Resin II was used in Example.

Synthesis Example 3

Synthesis of Polyimide Silicone

A flask equipped with a stirrer, thermometer and nitrogen inlet was charged with 133.2 g (0.30 mol) of 6FDA and 400 g of cyclohexanone. Then a solution of 11.7 g (9 mmol) of a diaminosiloxane of formula (12) wherein b=17.6, 95.6 g (0.27 mol) of HFP and 8.6 g (0.02 mol) of BAPP in 100 g of cyclohexanone was added dropwise to the flask at such a controlled rate that the temperature of the reaction system might not exceed 50° C. After the completion of dropwise addition, agitation was continued for 10 hours at room temperature.

After a reflux condenser with a water trap was attached to the flask, 60 g of toluene was added to the solution, which was heated at 150° C. and held at the temperature for 6 hours, yielding a brown solution. The solution was poured into methanol. The solids were taken out and dried, obtaining a brown resin. It was analyzed by infrared absorption spectroscopy whereupon the absorption peak based on polyamic acid indicating the presence of unreacted functional groups did not develop, and instead, the absorption peaks attributable to imide group developed at 1780 $cm^{-1}$ and 1720 $cm^{-1}$. By GPC using tetrahydrofuran as the solvent, the resin was measured to have a weight average molecular weight of 11,000 on a polystyrene standard. It had a phenol equivalent of 461 g/mol. This resin designated Polyimide Silicone Resin III was used in Example.

Synthesis Example 4

Synthesis of Polyamic Acid

A flask equipped with a stirrer, thermometer and nitrogen inlet was charged with 107.4 g (0.30 mol) of DSDA and 300 g of N-methyl-2-pyrrolidone. Then a solution of 48.0 g (0.24 mol) of DPE and 26.0 g (0.06 mol) of BAPP in 100 g of cyclohexanone was added dropwise to the flask at such a controlled rate that the temperature of the reaction system might not exceed 50° C. After the completion of dropwise addition, agitation was continued for 10 hours at room temperature. By GPC using tetrahydrofuran as the solvent, the resin was measured to have a weight average molecular weight of 21,000 on a polystyrene standard. This resin solution designated Polyimide Precursor Resin IV solution was used in Comparative Example.

Example 1

20 parts of Polyimide Silicone Resin I obtained in Synthesis Example 1 and 2.4 parts of epoxy compound GGA as the binder component were homogeneously dissolved in 100 parts of cyclohexanone. Then 30% by weight of the binder component (polyimide silicone resin and epoxy compound) was admixed with 70% by weight (52.7 parts) of activated carbon powder (mean particle size 10 $\mu$m). This composition was coated on an aluminum foil of 0.1 mm thick and heat treated at 105° C. for 30 minutes and then at 150° C. for 1 hour, thereby heat curing the composition to the aluminum foil. The sample thus obtained was examined for bend-following adhesion, electric conductivity and chemical resistance before and after a 240° C./240 hour aging test. Bend-following adhesion was examined by bending the sample around a mandrel having a diameter of 2 mm and visually observing the state thereof. As a result, stripping of the coating from the aluminum foil and cracking of the coating were not found before and after the aging test, indicating satisfactory heat resistant adhesion. As to electric conductivity, the resistivity of the electrode was measured by a tester. Chemical resistance was examined by immersing the samples in propylene carbonate, tetrahydrofuran, N-methyl-2-pyrrolidone, 2-butanone, toluene and 2-propanol at 25° C. for 96 hours and carrying out a cross-hatch strip test (JIS K5400) for observing the adhesion. No stripping was found, indicating excellent chemical resistance. The results are shown in Tables 2 and 3.

Examples 2–6

Coated samples were prepared as in Example 1 using the composition shown in Table 1 and similarly tested. The results are shown in Tables 2 and 3.

Comparative Example 1

100 parts of Polyimide Precursor Resin IV solution obtained in Synthesis Example 4 as the binder component was admixed with 72.8 parts of activated carbon powder (mean particle size 10 $\mu$m) and 100 parts of N-methyl-2-pyrrolidone. This composition was coated on an aluminum foil of 0.1 mm thick and heat treated at 150° C. for 30 minutes, then at 200° C. for 1 hour, and finally at 240° C. for 30 minutes, thereby heat curing the composition to the aluminum foil. The sample thus obtained was examined for bend-following adhesion, electric conductivity and chemical resistance before and after a 240° C./240 hour aging test, as in Example 1. The results are shown in Tables 2 and 3.

Comparative Example 2

A composition was prepared under the same conditions as in Comparative Example 1. It was coated on an aluminum foil of 0.1 mm thick and heat treated at 150° C. for 3 hours, thereby heat curing the composition to the aluminum foil. The sample thus obtained was examined for bend-following adhesion, electric conductivity and chemical resistance before and after a 240° C./240 hour aging test, as in Example 1. The results are shown in Tables 2 and 3.

TABLE 1

| | Resin | Parts | Epoxy compound | Parts | Activated carbon, parts |
|---|---|---|---|---|---|
| Example 1 | I | 20 | GGA | 2.4 | 52.3 |
| Example 2 | I | 20 | MBGA | 2.8 | 53.2 |
| Example 3 | II | 20 | MBGA | 7 | 63.0 |
| Example 4 | II | 20 | MBGA | 13.9 | 79.1 |
| Example 5 | III | 20 | GGA | 4 | 56.0 |
| Example 6 | III | 20 | GGA | 8 | 65.3 |
| Comparative Example 1 | IV | 100 | | | 72.8 |
| Comparative Example 2 | IV | 100 | | | 72.8 |

TABLE 2

| | Bend-following adhesion | | Conductivity (resistivity) | |
|---|---|---|---|---|
| | Initial | 240° C./240 hr | Initial | 240° C./240 hr |
| Example 1 | Good | Good | 0.52 | 0.54 |
| Example 2 | Good | Good | 0.52 | 0.53 |
| Example 3 | Good | Good | 0.5 | 0.53 |
| Example 4 | Good | Good | 0.54 | 0.55 |
| Example 5 | Good | Good | 0.51 | 0.52 |
| Example 6 | Good | Good | 0.52 | 0.52 |
| Comparative Example 1 | Stripped | Stripped | 0.5 | 0.52 |
| Comparative Example 2 | Stripped | Stripped | 0.7 | 0.55 |

TABLE 3

| | Chemical resistance | | | | | |
|---|---|---|---|---|---|---|
| | PC | THF | NMP | MEK | IPA | toluene |
| Example 1 | 0/100 | 0/100 | 0/100 | 0/100 | 0/100 | 0/100 |
| Example 2 | 0/100 | 0/100 | 0/100 | 0/100 | 0/100 | 0/100 |
| Example 3 | 0/100 | 0/100 | 0/100 | 0/100 | 0/100 | 0/100 |
| Example 4 | 0/100 | 0/100 | 0/100 | 0/100 | 0/100 | 0/100 |
| Example 5 | 0/100 | 0/100 | 0/100 | 0/100 | 0/100 | 0/100 |
| Example 6 | 0/100 | 0/100 | 0/100 | 0/100 | 0/100 | 0/100 |
| Comparative Example 1 | 0/100 | 0/100 | 0/100 | 0/100 | 0/100 | 0/100 |
| Comparative Example 2 | 44/100 | 65/100 | 70/100 | 15/100 | 1/100 | 1/100 | stripped sections/cross-hatch sections
PC: propylene carbonate
THF: tetrahydrofuran
NMP: N-methyl-2-pyrrolidone
MEK: 2-butanone
IPA: 2-propanol The electrode-forming composition of the invention can be cured and bonded to a current collector at a relatively low temperature and has excellent adhesion and chemical resistance, facilitating the manufacture of lithium ion batteries and electrical double-layer capacitors of various shapes other than cylindrical and rectangular shapes which have been difficult to manufacture so far.

Japanese Patent Application No. 2001-089667 is incorporated herein by reference.

Reasonable modifications and variations are possible from the foregoing disclosure without departing from either the spirit or scope of the present invention as defined by the claims.

What is claimed is:
1. An electrode-forming composition comprising
a binder component containing a solvent-soluble polyimide silicone and an epoxy compound, and
an electrically conductive material
wherein said polyimide silicone has the following general formula (1):

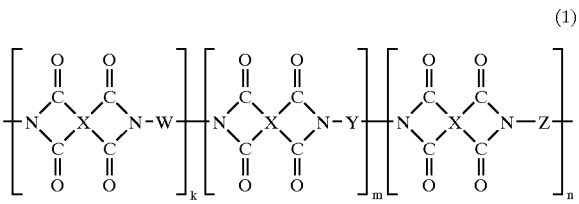

formula (1):
wherein X is at least one tetravalent organic group of the following formula (2), (3) or (4):

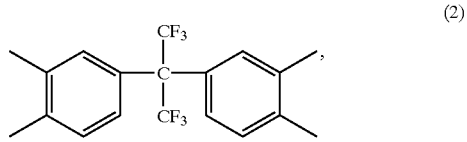

(2)

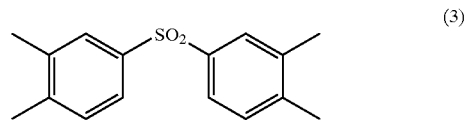

(3)

W is a divalent organic group of the following general formula (5):

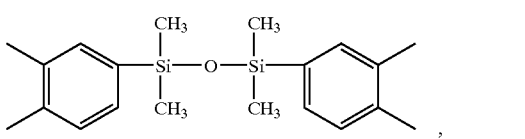

(4)

wherein B is a group of the following formula (6), (7) or (8):

Y is a divalent organic group of the following general formula (9):

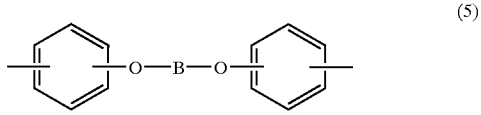

(5)

wherein D is $CH_2$, $(CH_3)_2C$ or $(CF_3)_1C$, and "a" is 0 or 1, and

Z is a divalent siloxane residue of the following general formula (10):

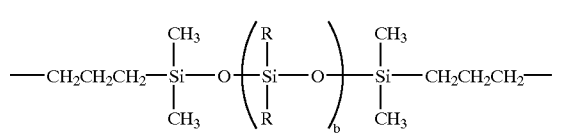

(10)

wherein R is independently a monovalent hydrocarbon group of 1 to 8 carbon atoms, and "b" is a positive number of 0 to 30, the letters k, m and n are numbers corresponding to 3 to 40 mol %, 40 to 90 mol %, and 1 to 40 mol %, respectively, and a proportion of the polyimide silicone and the epoxy compound in the binder component is such that the ratio of the moles of epoxy groups in the epoxy compound to the moles of phenolic hydroxyl groups in the polyimide silicone is from 1/1 to 3/1.

2. The composition of claim 1 wherein said epoxy compound contains at least three epoxy groups in the molecule and has an epoxy equivalent of up to 200 g/mol.

3. An electrode member obtained by applying the composition of claim 1 to a current collector and heat curing.

4. The composition of claim 1 wherein the polyimide silicone has a weight average molecular weioht of about 5,000 to 500,000.

5. The composition of claim 1 wherein the epoxy compound has at least two epoxy groups per molecule.

6. The composition of claim 1 wherein the epoxy compound has at least three epoxy groups per molecule.

7. The composition of claim 1 wherein the polyimide silicone and the epoxy compound are present in amounts such that the ratio of moles of epoxy groups in the epoxy compound to moles of phenolic hydroxyl groups in the polyimide silicone is from 1/1 to 3/1.

8. The composition of claim 1 further comprising an electrically conductive material.

9. The composition of claim 1 further comprising an electrically conductive material selected from the group consisting of activated carbon, carbon black and particles of conductive metal oxides.

10. The composition of claim 1 further comprising a solvent.

* * * * *